United States Patent [19]
Cordes et al.

[11] Patent Number: 5,538,208
[45] Date of Patent: Jul. 23, 1996

[54] SPACER MOUNTING FOR ELONGATED ELEMENTS, SUCH AS ELECTRICAL CABLE BUNDLES

[75] Inventors: Rolf Cordes, Seevetal; Hermann Hinrichs, Elstorf; Werner Piede, Jork; Guy Rossini, Hamburg, all of Germany

[73] Assignee: Daimler-Benz Aerospace Airbus GmbH, Hamburg, Germany

[21] Appl. No.: 201,180

[22] Filed: Feb. 24, 1994

[30] Foreign Application Priority Data

Feb. 26, 1993 [DE] Germany ............ 43 05 963.5

[51] Int. Cl.⁶ .................................. F16L 3/22
[52] U.S. Cl. .................. 248/69; 248/68.1; 248/73; 248/74.3
[58] Field of Search .................. 248/69, 68.1, 58, 248/62, 61, 73, 224.4, 65, 70, 74.3

[56] References Cited

U.S. PATENT DOCUMENTS

| | | | |
|---|---|---|---|
| 3,210,030 | 1/1963 | Ramsey et al. | 248/73 |
| 4,562,982 | 1/1986 | McSherry et al. | 248/61 |
| 4,602,760 | 7/1986 | Tiefenbach et al. | 248/544 |

FOREIGN PATENT DOCUMENTS

| | | |
|---|---|---|
| 1886744 | 11/1963 | Germany . |
| 2345843 | 3/1975 | Germany . |
| 2453844 | 5/1976 | Germany . |

*Primary Examiner*—Leslie A. Braun
*Assistant Examiner*—Anita M. King
*Attorney, Agent, or Firm*—W. G. Fasse; W. F. Fasse

[57] ABSTRACT

A single or twin spacer mounting permits the rapid and efficient installation of elongated elements for example in an aircraft. Such elements include, for example, electrical cable bundles, pipes, hoses, cables and the like, whereby these elongated elements must be maintained at a precise spacing from one another and/or from a support. Additionally, the elongated elements may need to be arranged at an angle relative to each other. For this purpose, substantially identical interlocking spacer mounting members are used. Each spacer mounting member has a saddle to which the elongated element is secured, for example, by a cable binder or hose clamp. The saddle is connected to an interlocking section that either includes a female plug-in socket or a male plug. In another embodiment interlocking pins with locking heads are used to hold two identical spacer mounting members to each other. Such a structure is able to hold the elongated elements at a precisely defined spacing and/or angle relative to each other without any damage, for example, to the insulation of electrical conductors.

22 Claims, 4 Drawing Sheets

SPACER MOUNTING FOR ELONGATED ELEMENTS, SUCH AS ELECTRICAL CABLE BUNDLES

BACKGROUND OF THE INVENTION

1. Field of the Invention

The invention relates to a mounting that functions simultaneously as a spacer for elongated elements. The term "elongated elements" is intended to include conduits, hoses, ropes, cables, including electrical cables, insulated electrical wires, or the like.

2. Description of the Related Art

Such spacer mountings are used particularly in aircraft and spacecraft construction in order to mount electrical conductor or cable bundles to a support such as a structural wall in the craft and to hold these mounted elongated elements at a precisely defined spacing, either from one another or from the supporting wall.

It is known to use as a spacer a pipe section, such as a hollow cylinder, for holding cable bundles spaced from each other by running a cable binder in a double-loop configuration through the hollow pipe section. The double-loop of the cable binder holds one cable bundle at one end of the pipe section and another cable bundle at the other end of the pipe section, whereby the length of the pipe section determines the spacing between the two cable bundles. The cables or electrically insulated wires are pressed against the end edges of the pipe section by tightening the double-looped cable binder. This is undesirable because the facing end edges of the pipe section are relatively sharp-edged so that damage to the insulation of the wires or cables is not excluded. Damage to the insulating of the cable or wires is quite likely to occur in response to relative motions between the cable bundle and the end faces of the spacer pipe section during flight.

Another disadvantage of the use of a pipe section as a spacer between cable bundles is seen in that the two cable bundles must extend substantially in parallel planes to one another so that angular orientations of the cable bundles relative to each other are not possible for all practical purposes. Thus, such a pipe section spacer cannot be used where it is necessary to install cable bundles in such a way that they cross each other at an angle. Twisting the two loops of the double-loop cable binder relative to each other is undesirable because it involves substantial disadvantages. For example, the twisted cable binder could break or it would not hold the desired angular orientation.

Another disadvantage is seen in that passing the cable binder through the pipe section to form the double loop is difficult, whereby the installation of the cables is made more difficult and a twisting of the cable binder is undesirable for the above mentioned reasons and further because it could cause kinking and pinching of the electrical conductors. Kinking and pinching must be avoided to prevent damage to the electrical conductors and their insulation. Further, a twisted cable binder has a tendency to return into an untwisted position so that the cable bundles can return into a substantially parallel orientation relative to each other.

OBJECTS OF THE INVENTION

In view of the foregoing it is the aim of the invention to achieve the following objects singly or in combination:

to provide a spacer mounting for elongated elements which permits holding these elongated elements in a defined position and at a required spacing from a support;

to construct the spacer mounting in such a way that two substantially mirror-symmetrical spacer mountings can be snapped together for holding two cable bundles at a defined spacing from each other;

to construct the two substantially mirror-symmetrical spacer mountings so that the connection therebetween is rotatable, whereby the two cable bundles can be angularly oriented relative to each other but held tight in the axial direction of the spacer mounting;

to avoid damage to the electrical conductors held by the spacer mounting and to make sure that the cable bundle is either spaced at a desired spacing from a support or that two cable bundles are properly spaced from each other or from a support;

to construct the individual spacer mountings in such a way that they can be connected either to each other, or to a support, or to each other and to a support or to an extension member for changing the axial spacing.

SUMMARY OF THE INVENTION

A spacer mounting member according to the invention for securing at least one elongated element is characterized by a saddle section for supporting the elongated element and by an interlocking section connected to the saddle section for securing the saddle section either to a support, or to another spacer mounting member of substantially identical construction, or to a support and to another spacer mounting member. The interlocking section comprises either a male or female plug-in connector device capable of cooperating with a respective opposite plug-in connector device and permitting an angular adjustment of the spacer mounting member, at least to a limited angular degree, such as 90°. The saddle section of each spacer mounting member comprises a saddle contoured to hold the elongated element, a cross-piece secured to the saddle, and a cable binder looped around the cross-piece for holding the elongated element in the saddle. Preferably, the saddle has two or four wings interconnected by the cross-piece so that the cross-piece extends with its longitudinal axis in parallel to the length of the elongated element resting on the saddle. The interlocking section provides a force transmitting, formlocking connection at least in the axial direction of the spacer mounting member while permitting at least a limited angular adjustment around a longitudinal axis of the spacer mounting member or members.

In a preferred embodiment at least two spacer mounting members are interlocked with each other, whereby one interlocking section is constructed as a female plug-in socket, while the other interlocking section is formed as a male plug-in connector. In another embodiment the interlocking is accomplished by a limited rotation of the two spacer mounting members about their common longitudinal axis.

It is a special advantage of the invention that elongated elements such as cable bundles may extend in two parallel planes, either parallel to one another or in a cross-over fashion while being held at a precisely defined spacing from one another without any pinching or kinking of the individual cables or conductors, thereby avoiding damage to these conductors. Another advantage is seen in that the installation of such elongated element, especially electrical cable bundles, has been substantially simplified so that, for example, the installation man-hours in the assembly of an aircraft have been correspondingly reduced.

By using one or more extension members, the spacings can be varied in well defined steps that depend on the axial length of the extension members. Parallel elongated elements and crossing elongated elements can now be installed with equal ease on opposite sides of a support structure such as a wall or the like. In one embodiment any desired crossing angle within a 90° range can be adjusted. In another embodiment at least two defined angular positions may be assumed by the two spacer mounting members relative to each other, whereby these members form a pair. In all embodiments, the angular position is determined precisely either by the installer without any special effort and expense or by the limited angular rotation of the two members relative to each other.

By incorporating a support between two spacer mounting members forming a pair, the pair can be attached as a unit to other carrying structures, thereby reducing the on-board time required for the installation, while permitting substantial preassemblies outside the aircraft. The support may be a simple sheet metal member or the like provided with a respective through bore, whereby either a pair of spacer mounting members may be attached to the support or an individual spacer mounting member may be secured to the support.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figures 8, 9:
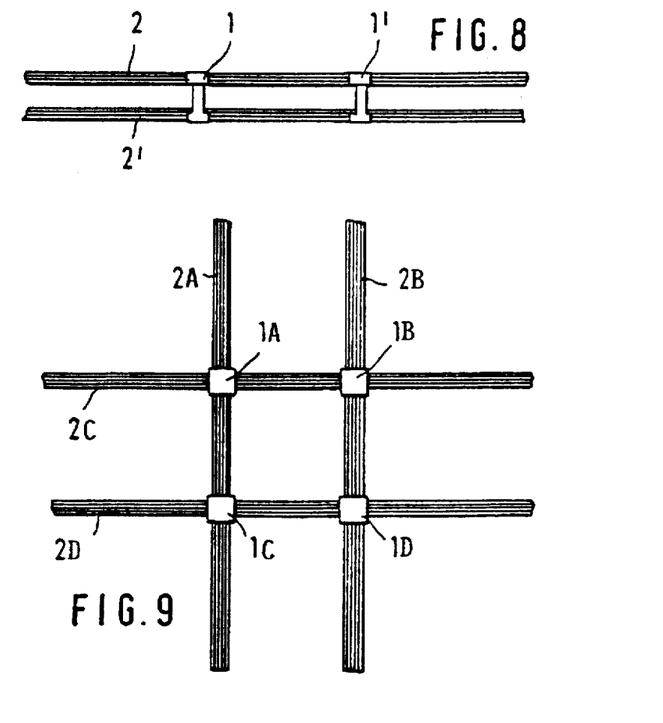
FIG. 8 illustrates schematically the arrangement of two parallel cable bundles held together by the present spacer mounting members.
FIG. 9 illustrates the arrangement of crossing cable bundles held together by the spacer mounting members of the invention to form a grid structure of cable bundles.

Referring first to FIGS. 8 and 9, these Figures illustrate several uses of the present spacer mounting members. In FIG. 8 two cable bundles 2 and 2' are held in parallel to each other and precisely spaced from each other by at least two spacer mountings 1 and 1'. FIG. 9 shows four cable bundles 2A, 2B, 2C and 2D held together in a grid structure by spacer mountings 1A, 1B, 1C, 1D. Only four of such spacer mountings are shown. More spacer mountings will be used as needed. Grid structures arranged in parallel, as in FIG. 8, can be established with the present spacer mountings.

Figure 1:
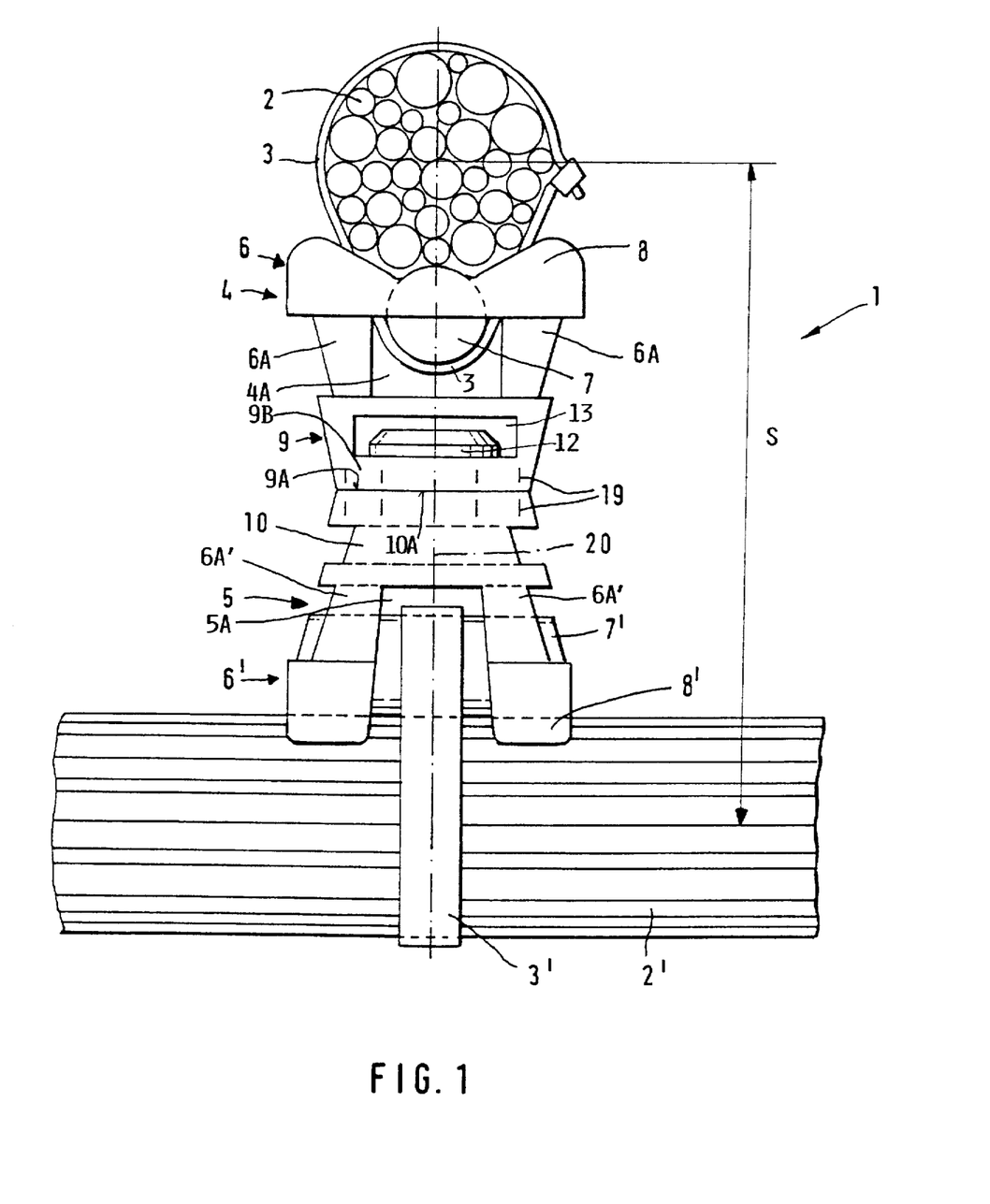
FIG. 1 illustrates a side view of two spacer mounting members according to the invention combined to form a pair for holding two cable bundles crossing each other at 90°.

FIG. 1 shows a twin spacer mounting 1 according to the invention including a first spacer mounting member 4 and a second spacer mounting member 5 together forming a pair. The individual mounting members 4 and 5 are coupled to each other in back-to-back fashion as will be described in more detail below. The upper spacer mounting member 4 holds a cable bundle 2 with a cable binder 3. The lower spacer mounting member 5 holds a second cable bundle 2' with a second cable binder 3'. The cable bundles 2 and 2' extend, for example, at right angles to each other and are spaced on-center from each other by a spacing S.

The spacer mounting member 4 comprises a saddle section 6 mounted by legs 6A to an interlocking section 9 including a female plug-in socket 9B for connection to the other spacer mounting member 5. The saddle section 6 comprises a number of saddle wings 8 shown in more detail in FIG. 3. The saddle wings 8 are interconnected by a cross-piece 7 extending in parallel to the longitudinal axis of the cable bundle 2.

Figure 2:
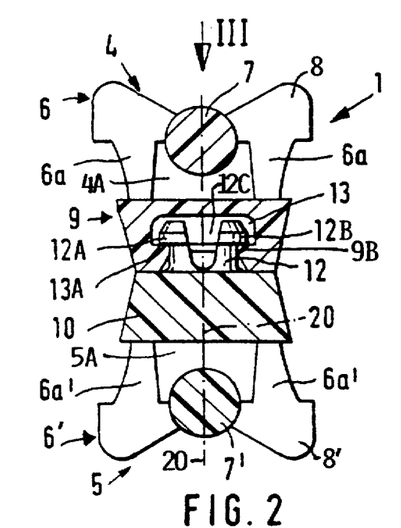
FIG. 2 is a view similar to that of FIG. 1, however showing the two spacer mounting members rotated so that the two elongated elements (not shown) extend in parallel to each other.

The second spacer mounting member 5 comprises a saddle section 6' with saddle wings 8' interconnected by a cross-piece 7' extending in parallel to the second cable bundle 2' resting against the saddle wings 8' and held in place by a cable binder 3'. The saddle section 6' is connected to a coupling or interlocking section 10 by legs 6A'. The coupling section 10 comprises a male plug 12 constructed for engaging the plug-in socket 9B of the interlocking section 9 as shown in FIG. 2. The circumferential outer surfaces of the interlocking section 9 and of the interlocking section 10 are provided with markers 19 that permit the direct reading of the angular relationship between the two cable bundles 2 and 2'. In the example shown in FIG. 1, the cross-over angle is 90°.

In both instances the cable bundles 2, 2' rest against the respective saddle wings 8, 8' and against the respective cross-piece 7, 7' without any pinching, nor any kinking, nor any contact with sharp edges. The cross-pieces 7 and 7' are cylindrical and extend substantially in parallel to the longitudinal axis of the two cable bundles 2, 2'. As seen in FIG. 1 the saddle wings 8 form together a trough with a wide angled V-configuration at the bottom of which the cross-piece 7 is located. The respective bundle is received in this trough. The same applies with regard to the saddle wings 8' and the respective cross-piece 7'. The legs 6A, 6A' which connect the respective saddle section to the corresponding interlocking section, are sufficiently spaced from each other so that the cable binders 3, 3' can pass conveniently through the respective passage 4A, 5A between the respective legs as best seen in the lower portion of FIG. 1 and in FIG. 3.

The two spacer mounting members 4 and 5 are interlocked with each other by first aligning the members 4 and 5 with respect to their common length axis 20 and then pushing the two members 4, 5 toward each other until the facing surfaces 9A and 10A contact each other, whereby the plug 12 of the interlocking section 10 interlocks with the socket 9B of the interlocking section 9. This axial interlocking permits a rotation of one member 4 relative to the other member 5 about the axis 20 to establish the above described angular relationship between the two cable bundles 2, 2'. The interlocking prevents a separation of the members 4 and 5 in the axial direction unless the top end of the male plug 12 is squeezed radially inwardly by a suitable tool inserted in an opening or recess 13 of the socket 9. For this purpose the plug 12 is preferably divided as shown in FIG. 2.

Referring to FIG. 2, the two spacer mounting members 4 and 5 of the twin spacer mounting 1 are held together in the direction of the axis 20 by the cooperation of the female socket 9B and the male plug 12, whereby the two members 4 and 5 are so oriented relative to each other that the two cross-pieces 7 and 7' extend in parallel to each other and in parallel to the elongated elements not shown in FIG. 2. The plug 12 has two radially extending projections 12A and 12B spaced from each other by a groove 12C which facilitates the radially inward squeezing of the projections 12A and 12B for unlocking the two members 4 and 5 from each other. The interlocking section 9 has a recess 13 provided with a circular shoulder 13A against which the projections 12A and 12B rest for interlocking, regardless of the rotational orientation of the two members 4 and 5 relative to each other. During initial insertion of the plug 12 into the socket 9B, the two portions of the plug 12 with their projections 12A and 12B are squeezed together and snap against the shoulder 13A when the projections 12A and 12B reach into the recess 13 and the facing surfaces 9A and 10A contact each other. The engagement of the projections 12A and 12B with the shoulder 13A provides a formlocking, force transmitting connection between the members 4 and 5 in the axial direction, however, permitting the above mentioned relative rotation between the members 4 and 5 about the axis 20, whereby the twin spacer mounting 1 of the invention is suitable for holding elongated elements either in parallel or in any angular relationship relative to each other without any pinching or kinking of the elongated elements. As mentioned, the groove 12C facilitates the squeezing of the projections 12A and 12B toward each other for releasing the connection by inserting a tool into the opening or recess 13.

Figure 3:
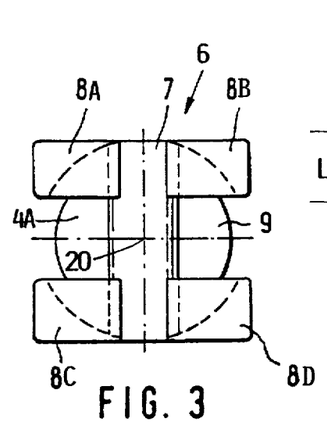
FIG. 3 is a plan view in the direction of the arrow III in FIG. 2.

FIG. 3 is a view in the direction of the arrow III in FIG. 2 and shows the saddle 6 of the spacer mounting member 4 having a total of four saddle wings 8A, 8B, 8C, and 8D which are preferably formed as integral components with the cross-piece 7 and the interlocking section 9, for example, by injection molding a suitable plastic material. The saddle wings 8A to 8D are symmetrically arranged relative to the central longitudinal axis 20 that extends perpendicularly to the drawing sheet of FIG. 3. The saddle wings 8A, 8B, 8C, and 8D form together with the cross-piece 7 the saddle 6 for the elongated element not shown in FIG. 3. The saddle forming components do not have any sharp edges and depending on the shape of the saddle wings, the elongated element may be encircled more or less. The cable binder passes through the space or passage 4A below the cross-piece 7 and between the saddle wings 8A and 8B on the one hand and 8C and 8D on the other hand.

Figure 4:
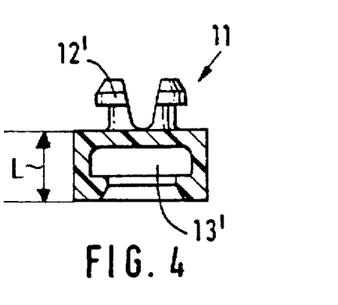
FIG. 4 shows an extension member with a male plug-in connector portion and a female plug-in connector portion.

FIG. 4 shows an extension element 11 that is provided with a male plug 12' on one side and with a female interlocking socket 13' on the other side. The axial length L of the extension element 11 contributes to the length of the spacing S shown in FIG. 1, depending on the number of extension elements used. The extension elements may be plugged into each other and when the required length is achieved, a female socket 9B of a spacer mounting member 4 receives the plug 12' while the socket 13' receives the plug 12 of a spacer mounting member 5.

Figure 5:
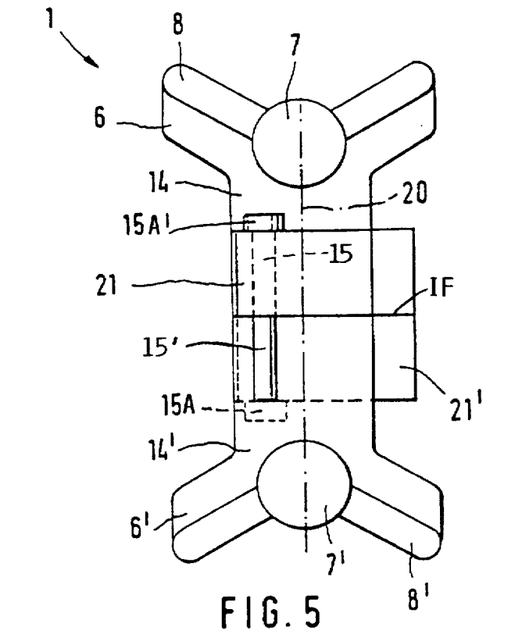
FIG. 5 illustrates a pair of spacer mounting members of a second embodiment according to the invention, wherein the two members can assume two different angular positions relative to each other about their common longitudinal axis.
Figure 6:
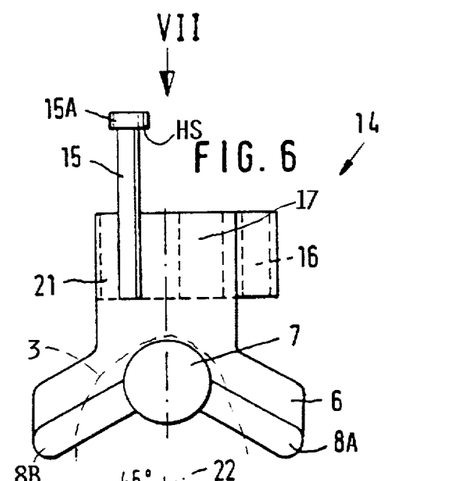
FIG. 6 shows the lower member with its interlocking pin of the pair shown in FIG. 5.
Figure 7:
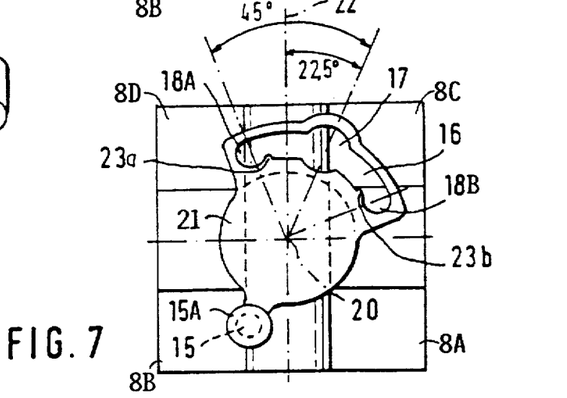
FIG. 7 is a view in the direction of the arrow VII in FIG. 6 to show an interlocking bracket.

FIGS. 5, 6, and 7 illustrate a second embodiment of the invention comprising two spacer mounting members 14 and 14' which are of identical construction. FIG. 6 illustrates one of the members 14, 14'. Again, a saddle 6 is formed by saddle wings 8A, 8B, 8C and 8D seen in FIG. 7. The saddle wings are interconnected by the cross-piece 7 formed as a cylindrical member holding the saddle wings to form a V-configuration in which the elongated element is received at least partly. Each spacer mounting member is provided with a respective interlocking section 21, 21' including an interlocking pin 15, 15' with a respective pin head or interlocking head 15A, 15A'. Each interlocking section 21, 21' is provided with a slot 16 that has the shape best seen in FIG. 7. A cable binder 3 is shown by a dashed line in FIG. 6.

Referring to FIG. 7, which is a view in the direction of the arrow VII in FIG. 6, the slot 16 of the interlocking section 21 has a widened mid portion 17 sized so that an interlocking pin head 15A, 15A' can pass through the widened portion 17. The slot 16 further has at each end an interlocking portion 18A and 18B.

When the two spacer mounting members 14 and 14' are interlocked with each other, the two locking pins 15, 15' are positioned diametrically opposite each other with their longitudinal axis extending in parallel to each and with their pin heads 15A and 15A' fitting into the respective widened slot portion 17. At this point the head shoulder HS faces the backside of the respective interlocking section 21, 21', and the frontside of each interlocking section forms an interlocking face IF, which contacts the interlocking face of the other interlocking section, as shown in FIG. 5. Further, the two longitudinal axes of the locking pin 15, 15' are equally spaced from the central axis 20 as best seen in FIG. 7. If the two members 14 and 14' are now rotated about the central axis 20, in one or the other direction of the slot 16 starting from the central widened portion 17, the pins 15, 15' will slide in the slot 16 until one or the other interlocking end position 18A, 18B is reached, whereby the head shoulder HS firmly engages behind the respective interlocking section 21, 21', thereby providing the required formlocking, force transmitting engagement between the two members 14, 14' against axial separation. The relative rotation between the two members 14, 14' is shown in FIG. 7 and may be, for example 45° in either direction from the center of the widened portion 17. The longitudinal axis 22 of the cross-piece 7 is spaced by about 22.5° relative to the center of the widened portions 17. Here again, the cross-piece 7 extends in parallel to the respective elongated element such as a cable bundle. The arrangement of the two members 14, 14' forming a pair provides a spacer mounting for elongated elements which extend in parallel to each other.

By providing a protrusion 23A at the end position 18A and another protrusion 23B at the end position 18B in the respective interlocking sections 21, 21', a snap-in function is provided so that the respective pins 15, 15' are held with a certain force in the end positions in an interlocked manner. This interlocking may be released by overcoming the snap-in force and rotating the two members relative to each other in the unlocking direction until the pin heads are again positioned in the widened portion 17, whereupon the two members can be pulled apart in the axial direction. No tools are needed for this operation, which can be quickly and efficiently performed, thereby facilitating the installation, for example, of cable bundles at the desired spacing and at a desired fixed angle. More specifically, the cables can be assembled outside the aircraft body and then interconnected with each other as just described, whereby the time needed for the on-board installation is substantially reduced.

Figure 10:
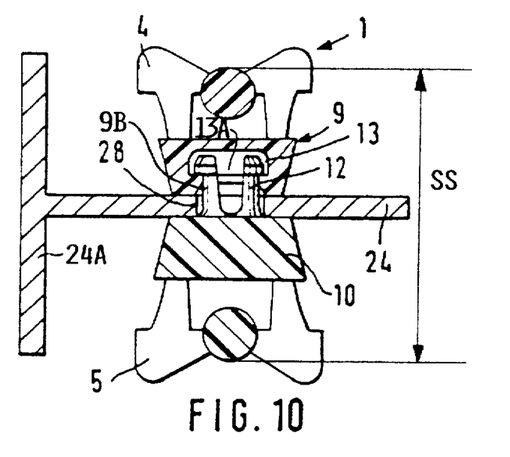
FIG. 10 is a view similar to that of FIG. 2, however showing the attachment of two spacer mounting members forming a pair to a support which in turn can be secured to a carrying structure.

FIG. 10 shows an embodiment in which two substantially identical spacer mounting members 4 and 5 are secured to each other and to a support 24 on opposite sides of the support 24. The support 24 is, for example, a T-rail or sheet metal member having a head section 24A that may be secured to other components such as parts of the aircraft body. This support 24 and the spacer mounting members 4 and 5 may be assembled outside the aircraft including the assembly of the elongated members not shown in FIG. 10. For assembling the two members 4 and 5 of the twin spacer mounting 1 with each other and with the support 24, the support 24 is provided with an opening 28 having a diameter sufficient for the passage of the interlocking projections of the plug 12. The axial length of the plug 12 between its radially facing projections and the support facing surface of the plug-in section 10 is so selected that the axial width of the support 24 is accommodated as shown in FIG. 10. Thus, the projections of the plug 12 engage the shoulder 13A in the recess 13 of the female interlocking section 9. A saddle spacing SS is maintained between the two cross-pieces.

Figure 11:
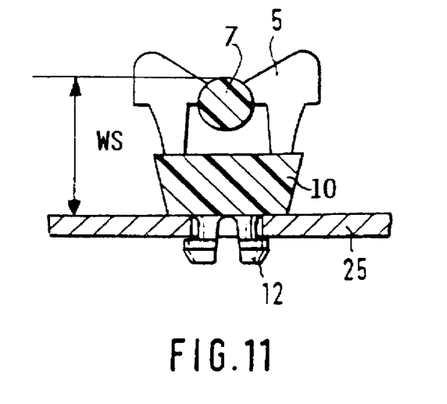
FIG. 11 shows the use of a single spacer mounting member according to the invention secured to a support.

In FIG. 11 a single male spacer mounting member 5 is secured to a support 25, whereby the plug 12 has a shorter axial length between its radially projecting shoulders and the support facing surface of the interlocking section 10 corresponding to the axial width of the support 25. A spacing WS is maintained between the surface of the support 25 and the bottom of the saddle defined by the cross-piece 7.

Figure 12:
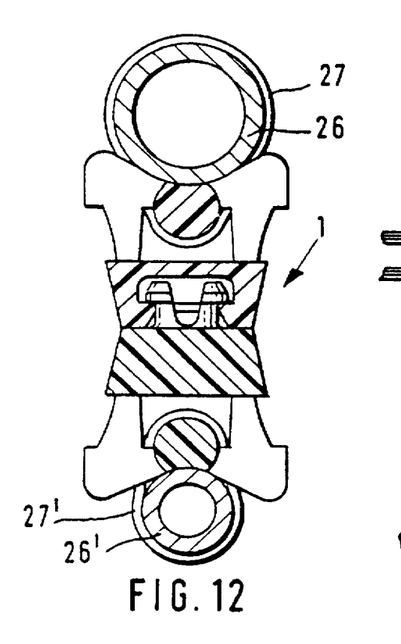
FIG. 12 shows a view similar to that of FIG. 2, but illustrating the mounting of two pipes in parallel to each other.

FIG. 12 shows an embodiment as in FIG. 2, however the respective saddles now carry two elongated elements 26 and 26', for example, pipes or hoses held in the respective saddle by a conventional hose or pipe clamp 27 and 27' respectively. The present spacer mounting thus permits a rapid and hence time saving, yet simple installation of such pipes, hoses, cable bundles and the like.

Although the invention has been described with reference to specific example embodiments, it will be appreciated that it is intended to cover all modifications and equivalents within the scope of the appended claims.

What we claim is:

1. A spacer mounting member for holding at least one elongated element, comprising a saddle section adapted to support said elongated element, and an interlocking section secured to said saddle section, wherein said interlocking section comprises an interlocking device adapted to secure said spacer mounting member to any one of a further spacer mounting member, a support, and an extension member, and wherein said saddle section comprises two pairs of saddle wings spaced apart to form a passage between said two pairs, and a cross-piece comprising a bar that has a rounded cross-section without protruding edges and that interconnects said saddle wings by bridging said passage and extending axially from one said pair to another said pair so as to extend in parallel to said elongated element, and wherein said passage is adapted to receive a binder element passing through said passage and partly around said cross-piece so as to hold said at least one elongated element in said saddle section.

2. The spacer mounting member of claim 1, wherein said interlocking device comprises a female plug-in socket with an interlocking shoulder in said plug-in socket.

3. The spacer mounting member of claim 1, wherein said interlocking device comprises a male interlocking plug with at least one interlocking projection.

4. The spacer mounting member of claim 3, wherein said interlocking plug has two elastically yielding plug portions spaced from each other by a groove for releasing a plugged-in connection with a mating female socket of another spacer mounting member, each of said plug portions having an approximately radially extending projection for forming an axially effective interlocking while permitting a rotation relative to another spacer mounting member.

5. The spacer mounting member of claim 1, wherein said interlocking section comprises angle indicator markings.

6. The spacer mounting member of claim 1, further comprising a support connected to said interlocking section.

7. The spacer mounting member of claim 1, further comprising an extension member connected to said interlocking section, wherein said extension member comprises two interlocking devices, one of which is connected to said interlocking device of said spacer mounting member.

8. The spacer mounting member of claim 1, wherein said bar of said cross-piece is a cylindrical bar.

9. The spacer mounting member of claim 1, wherein said interlocking device comprises an interlocking pin with an interlocking head and an interlocking slot in said interlocking device, said slot having an enlarged portion with a diameter through which said interlocking head can pass, said slot further having at least two interlocking positions for said interlocking pin.

10. The spacer mounting member of claim 9, wherein said enlarged slot portion has a central first axis extending in parallel to a longitudinal second axis of said interlocking pin, said spacer mounting member having a longitudinal axis positioned intermediate said first and second axes with equal radial spacings of said first and second axes from said longitudinal axis of said spacer mounting member.

11. The spacer mounting member of claim 10, wherein said interlocking slot extends along a circular arc having its center on said longitudinal axis of said spacer mounting member, and wherein said interlocking positions are located at each end of said slot symmetrically on either side of said enlarged slot portion.

12. The spacer mounting member of claim 11, wherein said interlocking positions are spaced from said enlarged slot portion by about 45°, and wherein said enlarged slot portion is spaced from a central longitudinal saddle axis by about 22.5°.

13. The spacer mounting member of claim 1, wherein said rounded cross-section of said bar includes a non-concave surface on a side adapted to face said elongated element.

14. The spacer mounting member of claim 1, wherein said two pairs of saddle wings are connected directly to said interlocking section, and wherein said cross-piece is connected only to said saddle wings and not to said interlocking section.

15. A combination of two spacer mounting members for holding two elongated elements spaced from each other comprising a first spacer mounting member and a second spacer mounting member, each spacer mounting member comprising a saddle section for supporting one of said elongated elements, and an interlocking section secured to said saddle section, said interlocking section of said first spacer mounting member comprising a first interlocking device, said interlocking section of said second spacer mounting member comprising a second interlocking device, said first and second interlocking devices being adapted for interlocking each other to form and force lock said first and second spacer members to each other in an axial direction while permitting a rotation movement of one spacer mounting member relative to the other spacer mounting member around a common longitudinal axis of said two spacer mounting members.

16. The combination of claim 15, wherein at least one of said first and second spacer mounting members comprises angular markers to indicate an angular position of said spacer mounting members relative to a longitudinal axis of said elongated element.

17. The combination of claim 15, wherein for each of said spacer mounting members, said saddle section comprises a plurality of saddle wings, a cross-piece interconnecting said saddle wings, and a passage between said saddle wings and bridged by said cross-piece, and wherein said passage is adapted to receive a binder element passing through said passage and partly around said cross-piece for holding said at least one elongated element in said saddle section.

18. The combination of claim 15, wherein each of said first and second interlocking sections comprises an interlocking pin with an interlocking head and an interlocking slot in each of said interlocking devices, each slot having an enlarged slot portion with a diameter through which said interlocking head can pass, said slot further having at least two interlocking positions for said interlocking pin, said enlarged slot portion having a central first axis extending in parallel to a longitudinal second axis of said interlocking pin, said spacer mounting members having a longitudinal axis positioned intermediate said first and second axes with equal radial spacings of said first and second axes from said longitudinal axis of said spacer mounting members, and wherein said interlocking slot extends along a circular arc having its center on said longitudinal axis, and wherein said interlocking positions are located at each end of said slot symmetrically on either side of said enlarged slot portion.

19. The combination of claim 18, wherein said interlocking positions are spaced from said enlarged slot portion by about 45°, and wherein said enlarged slot portion is spaced from a central longitudinal saddle axis by about 22.5°.

20. The combination of claim 15, wherein said rotation movement is a rotation movement through an angular range of up to 90°.

21. The combination of claim 15, wherein said first and second interlocking devices both have an identical configuration.

22. A spacer mounting member for holding at least one elongated element, comprising a saddle section adapted to support said elongated element, and an interlocking section secured to said saddle section, wherein said interlocking section comprises an interlocking device adapted to secure said spacer mounting member to any one of a further spacer mounting member, a support, and an extension member, and wherein said saddle section comprises a plurality of saddle wings, and a cross-piece interconnecting said saddle wings, and has a passage between said saddle wings that is bridged by said cross-piece, and a binder element passing through said passage and partly around said cross-piece so as to hold said at least one elongated element in said saddle section, wherein said interlocking section further has angle indicator markings.

* * * * *

UNITED STATES PATENT AND TRADEMARK OFFICE
CERTIFICATE OF CORRECTION

PATENT NO. : 5,538,208
DATED : July 23, 1996
INVENTOR(S) : Rolf Cordes et al.

It is certified that error appears in the above-indentified patent and that said Letters Patent is hereby corrected as shown below:

Column 5, line 10, replace "socket 9" by --interlocking section 9--.

Signed and Sealed this

Eighth Day of October, 1996

Attest:

BRUCE LEHMAN

Attesting Officer        Commissioner of Patents and Trademarks